United States Patent
Kim et al.

(10) Patent No.: US 7,862,922 B2
(45) Date of Patent: Jan. 4, 2011

(54) POLYMER ELECTROLYTE MEMBRANE FOR FUEL CELL AND FUEL CELL SYSTEM COMPRISING SAME

(75) Inventors: Hee-Tak Kim, Suwon-si (KR); Young-Mi Park, Suwon-si (KR); You-Mee Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1429 days.

(21) Appl. No.: 11/284,852

(22) Filed: Nov. 23, 2005

(65) Prior Publication Data

US 2006/0110645 A1    May 25, 2006

(30) Foreign Application Priority Data

Nov. 24, 2004   (KR) .................. 10-2004-0096834

(51) Int. Cl.
*H01M 8/10* (2006.01)

(52) U.S. Cl. .................. 429/33; 429/127; 429/129; 429/303; 429/306; 521/27

(58) Field of Classification Search .............. 429/33, 429/303, 127, 129, 306; 521/27
See application file for complete search history.

(56) References Cited

U.S. PATENT DOCUMENTS

| | | | | |
|---|---|---|---|---|
| 4,589,197 A | * | 5/1986 | North | 29/623.1 |
| 4,654,279 A | * | 3/1987 | Bauer et al. | 429/312 |

FOREIGN PATENT DOCUMENTS

| | | | |
|---|---|---|---|
| CN | 119408 | * | 11/1998 |
| CN | 1199408 | | 11/1998 |
| JP | 2000-276942 | * | 10/2000 |
| JP | 2002-110200 | | 4/2002 |
| JP | 2003-257453 | | 9/2003 |
| JP | 2004-018573 | | 1/2004 |
| JP | 2004-026936 | | 1/2004 |
| JP | 2004-182982 | * | 2/2004 |
| JP | 2004-119242 | | 4/2004 |
| WO | WO 02/088219 | | 11/2002 |

* cited by examiner

*Primary Examiner*—Peter D. Mulcahy
*Assistant Examiner*—Henry Hu
(74) *Attorney, Agent, or Firm*—Robert E. Bushnell, Esq.

(57) ABSTRACT

The polymer electrolyte membrane according to the present invention includes a proton-conducting polymer including metal ions bound to polyalkylene oxide. The polymer electrolyte membrane can save manufacturing cost of a fuel cell and improve proton conductivity and mechanical strength.

10 Claims, 1 Drawing Sheet

POLYMER ELECTROLYTE MEMBRANE FOR FUEL CELL AND FUEL CELL SYSTEM COMPRISING SAME

CLAIM OF PRIORITY

This application makes reference to, incorporates the same herein, and claims all benefits accruing under 35 U.S.C. §119 from an application for POLYMER ELECTROLYTE MEMBRANE FOR FUEL CELL AND FUEL CELL SYSTEM COMPRISING SAME earlier filed in the Korean Intellectual Property Office on 24 Nov. 2004 and there duly assigned Serial No. 10-2004-0096834.

FIELD OF THE INVENTION

The present invention relates to a polymer electrolyte membrane for a fuel cell, and a fuel cell system comprising the same. More particularly, the present invention relates to a polymer electrolyte membrane having various properties and that is prepared economically, and a fuel cell system comprising the same.

BACKGROUND OF THE INVENTION

A fuel cell is an electric power generation system that converts chemical reaction energy of oxygen and hydrogen contained in a hydrocarbon-based material such as methanol, ethanol, and natural gas directly into electrical energy.

The fuel cell can be classified into a phosphoric acid type, a molten carbonate type, a solid oxide type, a polymer electrolyte type, or an alkaline type of fuel cell depending upon the kind of electrolyte used. Although each fuel cell basically operates in accordance with the same principles, the kind of fuel, the operating temperature, the catalyst, and the electrolyte may be selected depending upon the type of cells.

Recently, a polymer electrolyte membrane fuel cell (PEMFC) in which power characteristics are superior to that of conventional fuel cells, operating temperature is lowered, and starting and response characteristics are quicker, has been developed. It has advantages in that it can be applied to wide fields such as a transportable electrical power source for an automobile, a distributed power such as for a house and a public building, and a small electrical power source for an electronic device.

According to the above-mentioned fuel cell system, the stack substantially generating the electricity has a structure in which several or several tens of unit cells consisting of a membrane electrode assembly (MEA) and a separator (also referred to as "bipolar plate") are laminated together. The membrane electrode assembly is composed of an anode (also referred to as a "fuel electrode" or an "oxidation electrode") and a cathode (also referred to as an "air electrode" or a "reduction electrode") separated by the polymer electrolyte membrane.

The polymer electrolyte membrane for the electrolyte is commercially available as a perfluorosulfonic acid ionomer membrane such as NAFION™ (fabricated by DuPont), FLEMION™ (fabricated by Asahi Glass), ASIPLEX™ (fabricated by Asahi Chemical), and DOW XUS™ (fabricated by Dow Chemical).

Conventional polymer membranes such as NAFION™ have advantages of excellent proton conductivity and high chemical-resistance, and they are not corroded easily. However, they have shortcomings in that they are expensive, and methanol crossover can be generated. Also, since the movement of H⁺ protons requires water, a humidifier should be additionally included. Therefore, the setup cost is high and a large setup space is required. In addition, when the fuel cell is operated at a high temperature, the moisture is evaporated and thus the proton conductivity is degraded.

SUMMARY OF THE INVENTION

In order to resolve the problems described above, an embodiment of the present invention provides a polymer electrolyte membrane for a fuel cell having a low cost and various properties due to easy controllability of its properties.

Another embodiment of the present invention provides a fuel system including the polymer electrolyte membrane.

According to one embodiment, a polymer membrane for a fuel cell includes a proton-conducting polymer having metal ions bound to polyalkylene oxide or its derivative.

According to another embodiment, the proton-conducting polymer is represented by the following Formula 1:

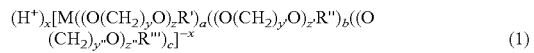

wherein in the above formula 1, M is Al, Au, Co, Cr, Fe, Ce, In, Mn, Ti, or V;
x is 0 or 1 depending upon a valence of M;
y, y' and y" are independently integers ranging from 1 to 6;
z, z' and z" are integers ranging from 10 to 1000;
R', R" and R'" are independently H, or an alkyl group;
a, b and c are determined depending upon a valence of M and range from 0 to 6, and the sum of a, b and c is not more than 6.

According to yet another embodiment, c is 0 in Formula 1. That is, Formula 1 is represented by Formula 2:

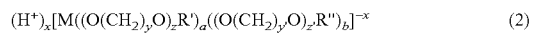

wherein in the above formula 1, M is Al, Au, Co, Cr, Fe, Ce, In, Mn, Ti, or V;
x is 0 or 1 depending upon a valence of M;
y and y' are independently integers ranging from 1 to 6;
z and z' are integers ranging from 10 to 1000;
R' and R" is H, or an alkyl group;
a and b are determined depending upon a valence of M and range from 0 to 6, and the sum of a and b is not more than 6.

According to a non-limiting embodiment, in the above Formula 2, a is 1, and b ranges from 0 to 5.

According to still another embodiment, the proton-conducting polymer may be represented by Formula 4:

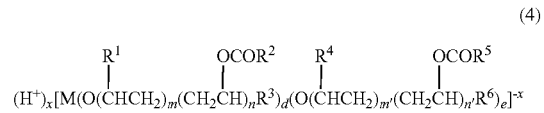

wherein M is Al, Au, Co, Cr, Fe, Ce, In, Mn, Ti, or V;
x is 0 or 1 depending upon a valence of M;
m and m' are integers ranging from 1 to 5;
n and n' are integers ranging from 5 to 1000;
R¹ to R⁶ are independently H, or an alkyl group, and preferably R² and R⁵ are methyl;
d and e are determined depending upon a valence of M and range from 0 to 6, and the sum of d and e is not more than 6.

According to another non-limiting embodiment, in the above Formula 4, d is 0, and e ranges from 1 to 5.

The proton-conducting polymer of the above Formula 1 is prepared by reacting a metal salt, and a polymer including at least one OH group or a furan-based polymer.

The proton-conducting polymer of the above Formula 4 is prepared by reacting a metal salt and a polymer including at least one OH group and CO group.

The present invention also provides a fuel cell system which includes at least one electricity generating element for generating electricity through oxidation of a fuel and reduction of an oxidant, a fuel supplier for providing the fuel to the electricity generating element, and an oxidant supplier for supplying the oxidant to the electricity generating element. The electricity generating element includes a membrane-electrode assembly which includes an anode and a cathode facing each other and a polymer electrolyte membrane interposed therebetween, and separators positioned at both sides of the membrane-electrode assembly. The polymer electrolyte membrane is composed of a polymer represented by the above Formula 1 or 4.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE INVENTION

Figure 1:
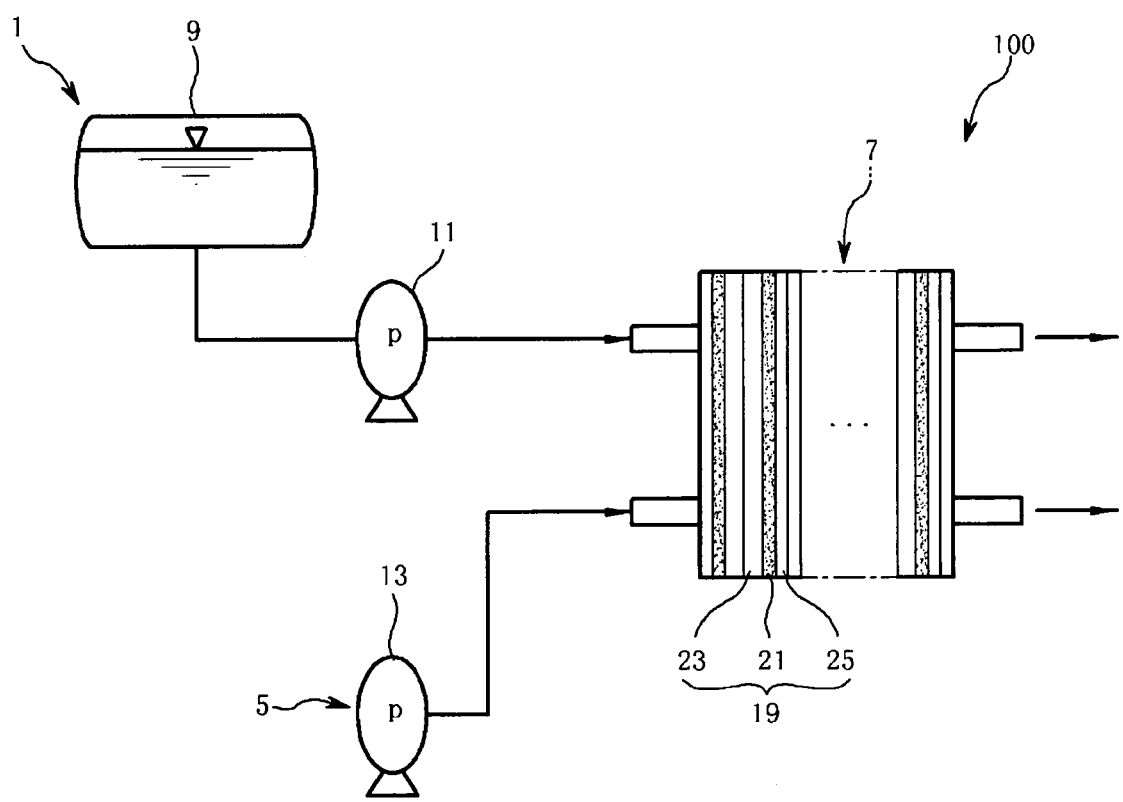
FIG. 1 is a schematic diagram illustrating a fuel cell system according to the present invention.

The present invention relates to a polymer electrolyte membrane including a proton-conducting polymer. A conventional polymer electrolyte membrane is composed of a fluorine-based polymer such as NAFION. However, the fluorine-based polymer is very expensive and is not operable at high temperatures.

The polymer in the polymer electrolyte membrane of the present invention is a proton-conducting polymer.

One embodiment of the proton-conducting polymer may be represented by Formula 1:

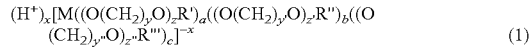
    (1)

wherein in the above formula 1, M is Al, Au, Co, Cr, Fe, Ce, In, Mn, Ti, or V;

x is 0 or 1 depending upon a valence of M;

y, y' and y" are independently integers ranging from 1 to 6;

z, z' and z" are integers ranging from 10 to 1000;

R', R" and R'" are independently H, or an alkyl group;

a, b and c are determined depending upon a valence of M and range from 0 to 6, and the sum of a, b and c is not more than 6.

According to one embodiment, c is 0 in Formula 1. That is, Formula 1 is represented by Formula 2:

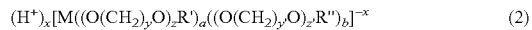
    (2)

wherein in the above formula 1, M is Al, Au, Co, Cr, Fe, Ce, In, Mn, Ti, or V;

x is 0 or 1 depending upon a valence of M;

y and y' are independently integers ranging from 1 to 6;

z and z' are integers ranging from 10 to 1000;

R' and R" is H, or an alkyl group;

a and b are determined depending upon a valence of M and range from 0 to 6, and the sum of a and b is not more than 6.

According to a non-limiting embodiment, in the above Formula 2, a is 1, and b ranges from 0 to 5.

In the case that M is Al, the polymer of the Formula 1 may be represented by the following Formula 3:

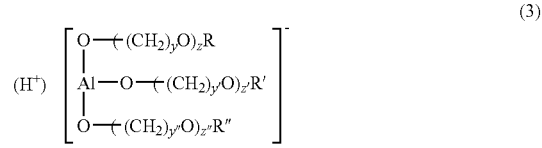
    (3)

wherein in the above formula 3 y, y', and y" are integers ranging from 1 to 6;

z, z' and z" are integers ranging from 10 to 1000; and

R, R', and R" are H, or an alkyl group.

According to a non-limiting embodiment, in the above Formula 3, at least one of R, R', and R" is H, and the remaining groups are methyl groups.

Another embodiment of the proton-conducting polymer may be represented by Formula 4:

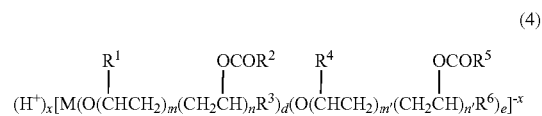
    (4)

wherein M is Al, Au, Co, Cr, Fe, Ce, In, Mn, Ti, or V;

x is 0 or 1 depending upon a valence of M;

m and m' are integers ranging from 1 to 5;

n and n' are integers ranging from 5 to 1000;

$R^1$ to $R^6$ are independently H or an alkyl group, and preferably $R^2$ and $R^5$ are methyl;

d and e are determined depending upon a valence of M and range from 0 to 6, and the sum of d and e is not more than 6.

According to another non-limiting embodiment, in the above Formula 4, d is 0 and e ranges from 1 to 5.

The proton-conducting polymer of the above Formula 1 is prepared by reacting a metal salt, and a polymer including at least one OH group or a furan-based polymer.

The metal salt can be compounds including Al, Au, Co, Cr, Fe, Ce, In, Mn, Ti, or V. Representative metal salts include a lithium metal hydride, a lithium metal fluoride, a lithium metal chloride, or a lithium metal bromide. The metal salts including Al include $LiAlH_4$, $LiAlF_4$, $LiAlCl_4$, $LiAlBr_4$, and a combination thereof.

The polymer including at least one OH group includes at least one selected from the group consisting of a polyalkyleneglycol such as polymethyleneglycol, polyethyleneglycol, polypropyleneglycol, polyvinylalcohol, poly(vinylalcohol-vinylacetate) copolymer, and polyhydroxyalkylacrylate such as polyhydroxymethylacrylate or polyhydroxybutylacrylate. The furan-based polymer includes polytetrahydrofuran. In this text, the alkyl may be a $C_1$ to $C_6$ alkyl and preferably $C_1$ to $C_6$ alkyl.

The following Reaction Scheme 1 shows a reaction between $LiAlH_4$ as the metal salt and polyethyleneglycol (R is H in Reaction Scheme 1) or polyethyleneglycol monoalkyl ether (R is an alkyl group in Reaction Scheme 1).

Reaction Scheme 1

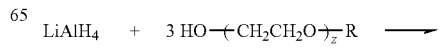

-continued

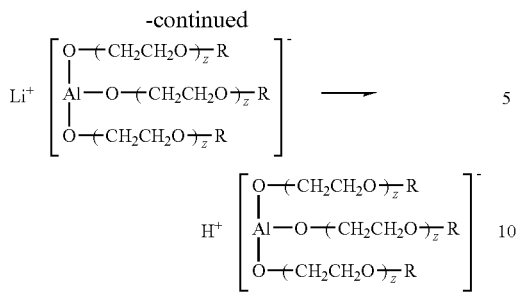

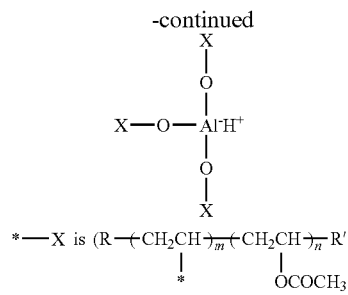

In Reaction Scheme 1, a mixed ratio of polyethyleneglycol and polyethyleneglycol monoalkyl ether can be controlled to obtain various proton-conducting polymers represented by Formula 1.

In addition, a reaction ratio between the metal salt and polymer including at least one OH group or a furan-based polymer can be controlled to adjust a proton concentration in the polymer including at least one OH group.

The metal salt and the polymer including at least one OH group or a furan-based polymer are preferably reacted in a mole ratio of 1:1.2 to 3.5. When the polymer is used at less than 1.2 mole ratio, cross-linking reaction may occur excessively, whereas when the polymer is used at more than 3.5 mole ratio, mechanical strength may decrease.

The reaction is performed in an aprotic polar solvent without an OH group as a reaction solvent. The aprotic polar solvent includes dimethoxyethane, diethylether, dimethylether, ethylene carbonate, propylene carbonate, and so on. A solvent having an OH group is not appropriate because it may react with a metal salt such as $LiAlH_4$ directly.

In the proton-conducting polymer of the above Formula 1 prepared through Reaction Scheme 1, protons are weakly bound to the metal and can be dissociated from the metal to contribute to a transfer of the protons. The number of cross-linking points is determined by the relative ratio between a polymer having at least two OH groups and a polymer having one OH group, and also by absolute amounts thereof. The cross-linking point is generated by forming a complex between the metal and OH groups.

The proton-conducting polymer of the above Formula 4 is prepared by reacting a metal salt and a polymer including at least one OH group and CO group. A representative reaction of the reaction reads as the following Reaction Scheme 2.

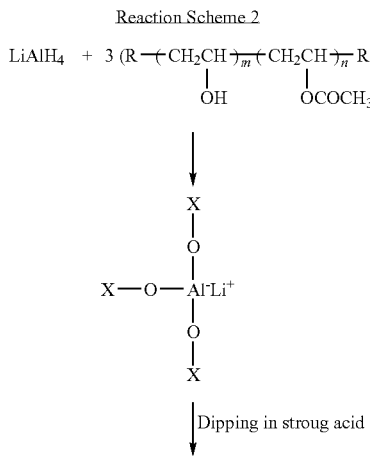

The polymer including at least one OH group and CO group is exemplified by a poly(vinylalcohol-vinylacetate) copolymer, polyhydroxyalkylacrylate such as polyhydroxymethylacrylate or polyhydroxybutylacrylate, or alkoxylated polyalkylene oxide such as methoxylated polyethylene oxide or polypropylene oxide. The strong acid includes HCl, $H_2SO_4$, or $H_3PO_4$. The properties can be controlled by hydrolysis level of the polymer and an amount of the metal.

The proton-conducting polymer of the present invention can be manufactured at a low cost, and its properties can be controlled easily to form a desired polymer with properties depending on use purposes. The polymer has high ion conductivity and strength. The polymer is a metal-polymer complex where the metal has a charge to act as a proton source, and as a crossed polymer the mechanical strength is improved. The polymer has appropriate moisture absorbing properties and has high ion conductivity to act as an ion conductor.

Accordingly, the polymer of the above Formula 1 or 4 is used as a polymer electrolyte membrane for a fuel cell. The polymer electrolyte membrane can be manufactured through casting the polymer, but the membrane manufacturing method is not limited thereto. Such a membrane manufacturing method is well-known in the related art and thus a detailed description thereof is omitted.

The polymer electrolyte membrane including the proton-conducting polymer represented by the above Formula 1 or 4 is interposed between a cathode and an anode to fabricate a membrane-electrode assembly.

The cathode and the anode are composed of an electrode substrate and a catalyst layer. The catalyst layer includes a metal catalyst which enables a related reaction (the oxidation of a fuel and the reduction of an oxidant). Suitable choices for the metal catalyst include at least one catalyst selected from the group consisting of platinum, ruthenium, osmium, a platinum-ruthenium alloy, a platinum-osmium alloy, a platinum-palladium alloy, or a platinum-M alloy where a suitable M is at least one transition metal selected from the group consisting of Ga, Ti, V, Cr, Mn, Fe, Co, Ni, Cu, and Zn. Among them, it is preferable to use at least one selected from the group consisting of platinum, ruthenium, osmium, a platinum-ruthenium alloy, a platinum-osmium alloy, a platinum-palladium alloy, a platinum-cobalt alloy, or a platinum-nickel alloy.

The metal catalyst is preferably supported on a carrier. The carrier may include carbon such as acetylene black, graphite, and so on, or an inorganic material particle such as alumina, silica, zirconia, titania, and so on. In one embodiment, the catalyst is a commercially available catalyst, or a produced product in which a noble metal material is supported on the carrier. Since the process to support the noble metal on a carrier is known to this art, even though it is omitted from this description, one skilled in the art may easily understand the present invention.

In fuel cell system, fuel is supplied to an anode and oxidant is supplied to the cathode to generate electricity through an electrochemical reaction between the anode and the cathode. At the anode, the hydrogen or an organic raw material is oxidized, and at the cathode, the oxidant is reduced, so that a voltage difference between the electrodes occurs.

The electrode substrate may include a carbon paper, a carbon cloth, or a carbon felt, but is not limited thereto. The electrode substrate supports the catalyst layer and enables a reaction fluid to diffuse in the catalyst layer. It may be treated with a fluorine-based polymer in order to provide a water repellant property so as to prevent deterioration of diffusion efficiency by water generated while driving the fuel cell. The fluorine-based polymer includes polyvinylidenefluoride, polytetrafluoroethylene, fluorinated ethylenepropylene, polychlorotrifluoroethylene, and so on.

The electrode may further include microporous layers in order to increase the reactant diffusion effects between the electrode substrate and the catalyst layers. The microporous layer may be formed by coating a composition including a conductive powder, a binder, and an ionomer as needed. In general, the conductive powder with small diameter particles can include carbon powder, carbon black, acetylene black, activated carbon, or nano-carbon such as carbon nanotubes, carbon nanofiber, carbon nanowire, carbon nanohorns, carbon nanorings, and the like.

Non-limiting examples of the binder can be polytetrafluoroethylene (PTFE), polyvinylidene fluoride, a copolymer of polyvinylidenefluoride-hexafluoropropylene (PVDF-HFP), polyvinylalcohol, cellulose acetate, and so on.

A fuel cell system including the above membrane-electrode assembly includes at least one electricity generating element, a fuel supplier, and an oxidant supplier. The fuel includes hydrogen or a hydrogen-containing hydrocarbon. The oxidant includes air or oxygen.

The electricity generating element includes a membrane-electrode assembly including an anode and a cathode and a polymer electrolyte membrane interposed therebetween, and separators positioned at both sides of the membrane-electrode assembly.

It generates electricity through oxidation of a fuel and reduction of an oxidant. The fuel includes hydrogen or a hydrogen-containing hydrocarbon. The oxidant includes air or oxygen.

The fuel supplier supplies the fuel to the electricity generating element, and the oxidant supplier supplies the oxidant to the electricity generating element.

The schematic structure of the fuel cell system according to the present invention is illustrated in FIG. 1, and will be described below while referring to the drawing. The fuel cell system 100 includes a stack 7 which includes at least one electricity generating element 19 to generate electrical energy through oxidation of the fuel and reduction of the oxidant, a fuel supplier 1, and an oxidant supplier 5.

The fuel supplier is equipped with a fuel storage tank 9, and a fuel pump 11 is connected to the fuel tank 9. The fuel pump 11 discharges a fuel stored in the fuel tank 9 with a predetermined pumping power.

The oxidant supplier 5 for supplying the oxidant to the electricity generating element 19 of the stack 7 is equipped with at least one pump 13 to draw an oxidant with a predetermined pumping force. The oxidant includes air or oxygen.

The electricity generating element 19 includes a membrane-electrode assembly 21 which performs oxidation of the fuel and oxidant reduction, and separators 23 and 25 which are positioned at both sides of the membrane-electrode assembly and provide fuel and oxidant with the membrane-electrode assembly 21.

The following examples illustrate the present invention in further detail. However, it is understood that the present invention is not limited by these examples.

Example 1

$LiAlH_4$ and polyethyleneglycol having a molecular weight of 500 were reacted in a weight ratio of 1:10 in dimethoxyethane solvent to prepare a proton-conducting polymer. Subsequently, hydrochloric acid was added to the proton-conducting polymer in the same mole ratio as $LiAlH_4$, and then the resulting mixture was agitated for 10 hours to prepare a proton-conducting polymer wherein Li ions were substituted with protons. The prepared proton-conducting polymer was cast on the glass substrate and then dried at 60° C. to prepare a polymer electrolyte membrane.

The polymer electrolyte membrane was interposed between the cathode and the anode, fired at 130° C. for 3 minutes, and then hot-pressed to fabricate a membrane-electrode assembly. The cathode and anode were fabricated by coating a catalyst slurry on a carbon paper. The catalyst slurry was prepared by mixing platinum catalysts supported on carbon powder (Pt/C), a polytetrafluoroethylene binder, and isopropyl alcohol solvent. The cathode and anode respectively had platinum catalyst amounts of 0.4 $mg/cm^2$.

The membrane-electrode assembly was inserted between gasket sheets, and then inserted between two separators having predetermined shaped reactant flow channels and cooling channels. It was then inserted between copper end plates and pressed to fabricate a unit cell.

Example 2

$LiAlH_4$ and polyethyleneglycol having a molecular weight of 1000 were reacted in a weight ratio of 1:5 in dimethoxyethane solvent to prepare a proton-conducting polymer. Subsequently, hydrochloric acid was added to the proton-conducting polymer in the same mole ratio as $LiAlH_4$, and the resulting mixture was then agitated for 10 hours to prepare a proton-conducting polymer where Li ions were substituted with protons. The prepared proton-conducting polymer was cast on the glass substrate and dried at 60° C. to prepare a polymer electrolyte membrane.

The polymer electrolyte membrane was interposed between the cathode and the anode, fired at 130° C. for 3 minutes, and hot-pressed to fabricate a membrane-electrode assembly. The cathode and anode were fabricated by coating a catalyst slurry on a carbon paper. The catalyst slurry was prepared by mixing platinum catalysts supported on carbon powder (Pt/C), a polytetrafluoroethylene binder, and isopropyl alcohol solvent. The cathode and anode respectively had platinum catalyst amounts of 0.4 $mg/cm^2$.

The membrane-electrode assembly was inserted between gasket sheets, and then inserted between two separators having predetermined shaped reactant flow channels and cooling channels. It was then inserted between copper end plates and pressed to fabricate a unit cell.

Example 3

$LiAlH_4$ and 70% hydrolyzed polyvinyl alcohol having a molecular weight of 100,000 were reacted in a weight ratio of 1:20 in dimethoxyethane solvent to prepare a proton-conducting polymer. Subsequently, hydrochloric acid was added to the proton-conducting polymer in the same mole ratio as LiAlH$_4$, and the resulting mixture was agitated for 10 hours to prepare a proton-conducting polymer where Li ions were substituted with protons. The prepared proton-conducting polymer was cast on the glass substrate and then dried at 60° C. to prepare a polymer electrolyte membrane. A unit cell was fabricated using the above proton-conducting polymer by the same method as in Example 1.

Example 4

LiAlH$_4$ and 70% hydrolyzed polyvinyl alcohol having a molecular weight of 100,000 were reacted in a weight ratio of 1:10 in dimethoxyethane solvent to prepare a proton-conducting polymer. Subsequently, hydrochloric acid was added to the proton-conducting polymer in the same mole ratio as LiAlH$_4$, and the resulting mixture was agitated for 10 hours to prepare a proton-conducting polymer where Li ions were substituted with protons. The prepared proton-conducting polymer was cast on the glass substrate and then dried at 60° C. to prepare polymer electrolyte membrane. A unit cell was fabricated by the same method as in Example 1, except for using the above proton-conducting polymer.

Comparative Example 1

A unit cell was fabricated by the same method as in Example 1 except that NAFION 112 (Dupont chemical company) was used as a polymer electrolyte membrane.

The polymer electrolyte membranes and the unit cells fabricated in the examples and comparative example were measured with respect to their performances. The results are shown in Table 1. Non-humidified hydrogen and air were injected into the unit cells fabricated in the above examples and comparative examples at normal pressure.

TABLE 1

| | Ion conductivity (30% humidifying condition, room temp.) (S/cm) | current density at 6 V (A/cm$^2$) |
|---|---|---|
| Example 1 | 0.5 | 0.52 |
| Example 2 | 0.8 | 0.61 |
| Example 3 | 0.3 | 0.48 |
| Example 4 | 0.5 | 0.50 |
| Comparative Example 1 | 0.1 | 0.27 |

As shown in Table 1, the proton conductivity of the polymer electrolyte membrane according to Examples 1 to 4 was better than that of NAFION 112 of Comparative Example 1 under the non-humidifying condition. This results from improved hygroscopicity of the polymer according to Examples 1 to 4.

Comparing Examples 1 and 2, the polymer of Example 2 has good conductivity. These results from the LiAlH$_4$ concentration being lower, so the cross-linking of the polymer decreased and hygroscopicity increased. As such, comparing Examples 3 and 4, the polymer according to Example 4 having low cross-linking realizes improved ion conductivity.

The unit cell performances according to Examples 1 to 4 and Comparative Example 1 shows that a membrane with high ion conductivity realizes a high current density when non-humidified fuel and air are injected. In the case of Examples 1 to 4, the polymer electrolyte membranes come to have high ion conductivity by water generated in the cathode under the condition of supplying non-humidified fuel and air, and resultantly realize high current densities.

As described above, the polymer electrolyte membrane according to the present invention has good proton conductivity and mechanical strength.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polymer electrolyte membrane, comprising:
a proton-conducting polymer selected from the group consisting of a polymer represented by one of Formula 1 and Formula 4 and a combination thereof:

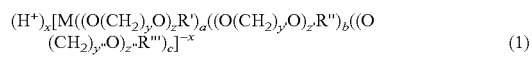

wherein M is Al, Au, Co, Cr, Fe, Ce, In, Mn, Ti, or V;
x is 0 or 1 depending upon a valence of M;
y, y' and y" are independently integers ranging from 1 to 6;
z, z' and z" are integers ranging from 10 to 1000;
R', R" and R''' are independently H, or an alkyl group; and
a, b and c are determined depending upon a valence of M and range from 0 to 6, and the sum of a, b and c is not more than 6, but is more than 0; and

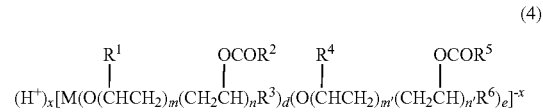

wherein M is Al, Au, Co, Cr, Fe, Ce, In, Mn, Ti, or V;
x is 0 or 1 depending upon a valence of M;
m and m' are integers ranging from 1 to 5;
n and n' are integers ranging from 5 to 1000;
$R^1$ to $R^6$ are independently H, or an alkyl group; and
d and e are determined depending upon a valence of M and range from 0 to 6, and the sum of d and e is not more than 6, but is more than 0.

2. The polymer electrolyte membrane of claim 1, wherein the proton-conducting polymer is represented by Formula 1, and c in Formula 1 is 0.

3. The polymer electrolyte membrane of claim 2, wherein the proton-conducting polymer is represented by Formula 1, and a is 1, and b ranges from 0 to 5.

4. The polymer electrolyte membrane of claim 1, wherein the proton-conducting polymer is represented by Formula 4, and d is 0 and e ranges from 1 to 5.

5. The polymer electrolyte membrane of claim 1, wherein the proton-conducting polymer is represented by Formula 1, and M is Al, a, b and c are each 1, and x is 1.

6. The proton-conducting polymer of claim 1, wherein the proton-conducting polymer is represented by Formula 1, and the proton-conducting polymer of Formula 1 is prepared by reacting a metal salt, and a polymer including at least one OH group or a furan-based polymer.

7. The proton-conducting polymer of claim 6, wherein the polymer including at least one OH group is at least one selected from the group consisting of polyalkyleneglycol, polyvinylalcohol, poly(vinylalcohol-vinylacetate) copolymer, or polyhydroxyalkylacrylate, and a combination thereof, and the furan-based polymer is polytetrahydrofuran.

8. The proton-conducting polymer of claim 6, wherein the reaction is performed in an aprotic polar solvent.

9. The proton-conducting polymer of claim 1, wherein the proton-conducting polymer is represented by Formula 4, and the proton-conducting polymer of Formula 4 is prepared by reacting a metal salt and a polymer including a CO group, and at least one OH group.

10. The proton-conducting polymer of claim 9, wherein the polymer including at least one OH group and CO group is at least one selected from the group consisting of a poly(vinylalcohol-vinylacetate) copolymer, polyvinyl alcohol, polyhydroxyalkylacrylate, alkoxylated polyalkylene oxide, and a combination thereof.

* * * * *